Nov. 26, 1968   F. M. BROWN ETAL   3,412,424
BONE PINNING MACHINE

Filed Aug. 12, 1966   3 Sheets-Sheet 1

INVENTORS
JESSE A. WILLCOX,
FRANK M. BROWN,
JEAN A. BURTON,
GERALD L. HELGESON

BY Williamson, Palmatier
& Bains

ATTORNEYS

Nov. 26, 1968

F. M. BROWN ETAL 3,412,424

BONE PINNING MACHINE

Filed Aug. 12, 1966

INVENTORS
JESSE A. WILLCOX,
FRANK M. BROWN,
JEAN A. BURTON,
GERALD L. HELGESON

BY
*Williamson, Palmatier*
*& Bains*
ATTORNEYS

United States Patent Office 3,412,424
Patented Nov. 26, 1968

3,412,424
BONE PINNING MACHINE
Frank M. Brown, Jean A. Burton, and Gerald L. Helgeson, Austin, and Jesse A. Willcox, Excelsior, Minn., assignors to Geo. A. Hormel & Company, Austin, Minn., a corporation of Delaware
Filed Aug 12, 1966, Ser. No. 572,077
8 Claims. (Cl. 17—1)

This invention relates to apparatus for immobilizing the bone joint in a chunk of meat for use in a deboning operation. The present bone joint immobilizing apparatus is adapted to use in a deboning operation such as that described in my copending application Ser. No. 493,362, filed Oct. 6, 1965, now abandoned. In this deboning operation, a chunk of meat having a bone therein is positioned against a barrier and that portion of a chunk of meat adjacent the bone is subjected to the blasting action of a flowable material while producing relative movement between the chunk of meat and barrier. The flowable material is preferably water, which is discharged through high velocity jets, and this flowable material very effectively separates the bone from the chunk of meat while permitting the chunk of meat to remain substantially intact after removal of the bone therefrom.

Since many chunks or pieces of meat which are to be deboned have articultaed joints therein, it is desirable and sometimes essential to immobilize the bones of the articulated joint and preferably align the same, especially shaft bones such as those found in shoulder cuts, hams, hind shanks and the like. Thus, it is a function of the present bone joint immobilizing apparatus to provide a very effective and efficient means to align and immobilize the articulated joint in predetermined relation.

An object of this invention is to provide an apparatus for immobilizing an articulated bone joint in a chunk of meat to facilitate removal of the bone in a deboning operation.

A more specific object of this invention is to provide an apparatus for immobilizing an articulated bone joint in a chunk of meat wherein the joint is immobilized by pin means driven through the bones at the joint so that the bones are interlocked together in a predetermined relation, thereby facilitating separation of the bone from the chunk of meat through the use of hydraulic pressure.

These and other objects and advantages of this invention will more fully appear from the following description made in connection with the accompanying drawings wherein like reference characters refer to the same or similar parts throughout the several views, and in which.

Figure 1:
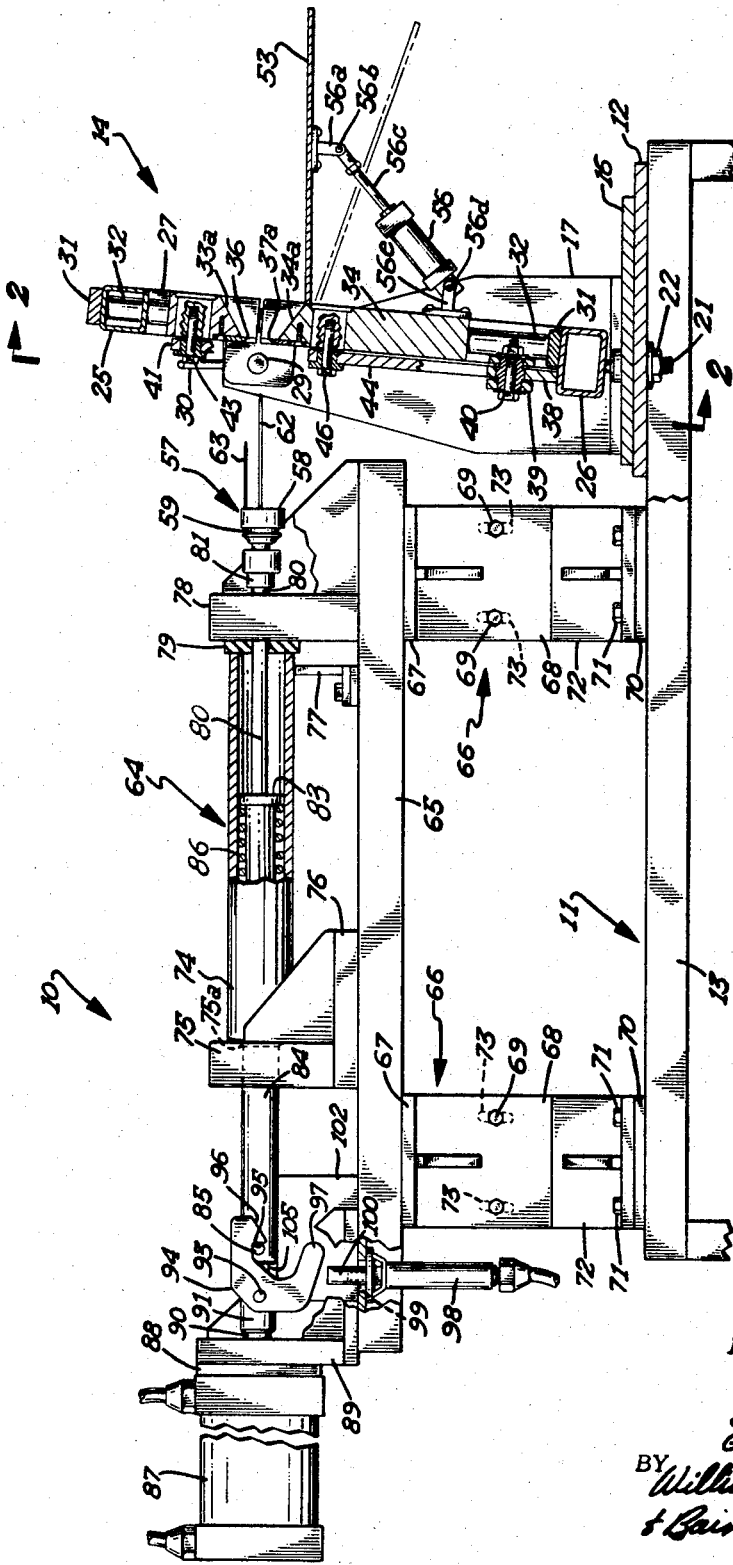
FIG. 1 is a side elevational view of the invention.

Referring now to the drawings, one embodiment of the bone joint immobilizing apparatus, designated generally by reference numeral 10, is there shown. The apparatus 10 as shown, includes a base or support structure 11 comprised of a substantially flat generally rectangular support plate 12 having a pair of elongate support members 13 of generally rectangular cross-sectional configuration affixed to the lower surface of the support plate 12 by welding or the like.

Figure 2:
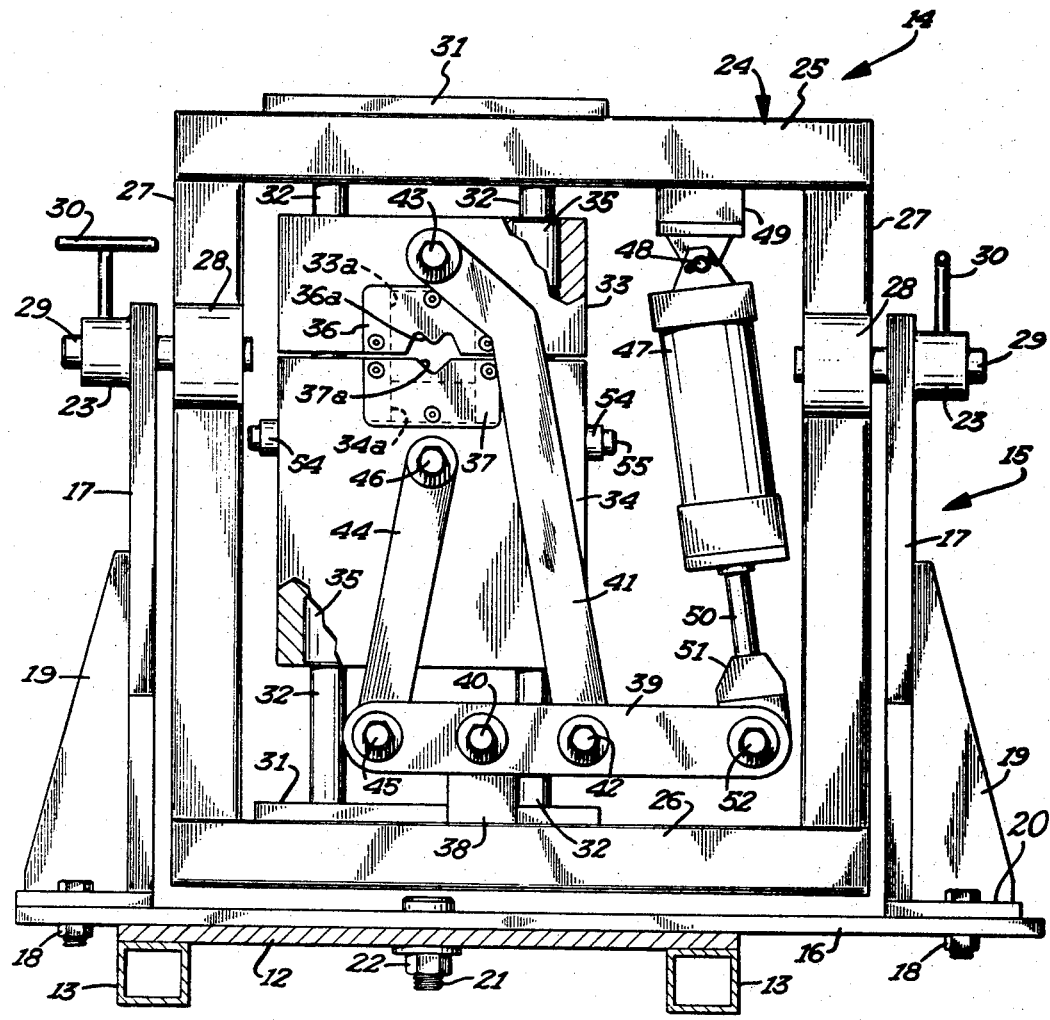
FIG. 2 is a sectional view on an enlarged scale taken approximately along line 2—2 of FIG. 1 and looking in the direction of the arrows.

Means are provided for clamping and positioning the chunk of meat in a predetermined position to permit immobilization of the articulate joint therein, and this entire positioning and clamping structure is designated by reference numeral 14. The positioning and clamping structure 14 includes a positioning frame 15 which is of generally U-shaped configuration and which includes a transverse plate or member 16 of generally rectangular configuration and having a pair of leg members 17 affixed thereto by suitable nut and bolt assemblies 18 and projecting therefrom as best seen in FIG. 2. The leg members 17 are preferably formed from flat stock having reinforcing gussett plates 19 adjacent their interconnected end and being provided with outturned flanges 20, the latter being apertured to receive the nut and bolt assemblies therethrough.

It is pointed out that the particular orientation of the bone joint immobilizing apparatus 10 is not required to be horizontal, although for purpose of illustration, the apparatus has been shown horizontally oriented. When so oriented, the positioning frame 15 will be disposed in a generally upright position while the support structure 11 will be horiozntally disposed.

Referring again to FIG. 2, it will be seen that the transverse plate 16 has an aperture therein intermediate the longitudinal edges thereof as does the support plate 12. A bolt 21 projects through the plates 12 and 16 and is secured thereto by suitable nut 22. This bolt 21 actually defines a pivot connection between the support structure and positioning frame to permit relative swinging movement therebetween about axis defined by the bolt 21. Since the apparatus is generally horizontally oriented, the axis of the bolt will be vertically oriented, and the positioning frame may be swung into an adjusted angulated position relative to the support structure 11.

The upper ends of the leg member 17 are apertured and have sleeve type bearings 23 integrally formed therewith and projecting laterally outwardly therefrom. The positioning frame 15 swingably supports clamping means which is comprised of a generally rectangular shaped clamping frame including an upper transverse frame member 25, a lower transverse frame member 26 and a pair of upstanding side frame members 27 extending between and interconnected to the upper and lower frame members.

It will be noted that the frame members are of substantially rectangular cross-sectional configuration and each of the vertical frame members 27 is provided with a mounting bracket 28 rigidly affixed thereto and projecting forwardly therefrom. These mounting brackets 28 are located intermediate the respective ends of the associated vertical frame member 27 and each has a trunnion pin 29 rigidly affixed thereto and projecting outwardly therefrom. These trunnion pins 29 are received and journalled within the sleeve bearings 23 to permit swinging movement of the clamping frame 24 about an axis which is disposed substantially normal to the axis of pivot of the positioning frame 17. The clamping frame may be locked in an adjusted position by means of locking screws 30 each having a T-shaped gripping end to facilitate gripping thereof and each threadingly engaging a threaded recess and one of the sleeve bearings 23.

Referring again to FIG. 2 it will be seen that the upper and lower transverse frame members are each provided with flat attachment plates 31 which are rigidly affixed to the associated frame member by welding or the like. A pair of elongate guide rods 32 disposed in substantially parallel relation with respect to each other have their opposite ends rigidly secured to attachment plates 31. Guide rods 32 provide a guiding and sliding medium for an upper clamping plate 33 and a lower clamping plate 34. These clamping plates are each provided with suitable sleeve type slide bearings 35 which are disposed in concentric relation around the guide rods 32 whereby the clamping plates are mounted for translatory movement towards and away from each other.

The upper clamping plate 33 has a centrally located notch or recess 33a therein, while the lower clamping plate also has a recess 34a therein disposed in substantially registering relation with the recess 33a. The upper clamping plate 33 has a clamping jaw 36 secured thereto as by bolts or the like, while the lower clamping plate 34 also has a cooperating clamping jaw 37 secured thereto. These clamping jaws are secured to their associated clamping plates to at least partially obstruct or cover the recesses or notches in the clamping plates.

The clamping jaws are movable with the clamping plates towards and away from each other between release and clamping positions. It wil be noted, that in FIG. 2 the clamping jaws are disposed in the clamping position and the upper clamping jaw 36 presents a downwardly facing convex clamping surface 36a while the lower clamping jaw 37 presents an upwardly concave clamping surface 37a. These clamping surfaces are spaced from each other even when the jaws are in the clamping position but serve to very effectively clamp the reduced end of a chunk of meat therein.

Means are also provided for shifting the clamping plates and their associated clamping jaws between release and clamping positions and this means includes a small bracket 38 affixed to the lower transverse frame member 26 and projecting upwardly therefrom intermediate the ends thereof. An elongate lever 39 is pivotally connected to the bracket 38 by pivot 40 to permit pivoting movement of the later about a substantially horizontal axis.

One end of an elongate link 41 is pivotally connected at its lower end by pivot 42 to the lever 39 adjacent one side of its pivot connection 40 and the other end of this link 41 is pivotally connected to the upper jaw plate 33 by pivot 43. A second link 44 is pivotally connected at its lower end by pivot 45 to the lever 39 adjacent the other side of its pivotal connection 40 with the bracket 38, and the other end of link 44 is pivotally connected to the lower jaw plate 34 by pivot 46.

It will be noted, that the link 41 is of crank shape configuration so that the pivots 43 and 46 are in substantially vertical alignment. It will also be noted that the pivots 42 and 45 between the respective links and the lever 39 are located on opposite sides of the pivotal connection 40 between the link 39 and its bracket 38. These pivots 42 and 45 are in horizontal alignment when the jaw plates and associated jaws are in the closed or clamping position.

Means are also provided for power shifting the lever 39 and this means includes a double acting pneumatic cylinder 47 connected to a source of air under pressure by suitable conduit means (not shown) and having a piston movable therein. The cylinder 47 is pivotally connected by means of a pivot 48 to a bracket 49 secured to the upper frame member 25. The piston in cylinder 47 has a piston rod 50 secured thereto and movable therewith and this piston rod 50 has an attachment bracket 51 secured to its outermost end, the latter being pivotally connected to the lever 39 by a pivot 52. The piston rod 50 is retractable from its extended position as shown in FIG. 2 to a retracted position wherein the lever is swung about its pivot 40 to shift the clamping plates and the associated clamping jaws to either release or open condition and when extended to the position illustrated in FIG. 2, shifts the clamping plates and clamping jaws to the clamping or closed position. It will be noted, that when the piston rod 50 is retracted from the position illustrated in FIG. 2, the pivot points 42 and 45 will be swung in a counterclockwise direction while extension of the piston rod 50 swings the lever in a direction to move the pivots 42 and 45 in a clockwise direction.

When it is desirable to debone a pork shoulder, the chunk of meat will include the articulated joint between the humerus, radius and ulna. The reduced end of the cut which includes the distal end portions of the radius an ulna will be positioned between the clamping jaws 36 and 37 and will be clamped therebetween. Means are provided for supporting the weight of the chunk of meat and also for applying pressure thereagainst to shift the humerus bone into a more aligned relation with the radius and ulna than when these bones are in the relaxed condition. This means includes an alignment and support member or plate 53 which is provided with a pair of forwardly projecting arms 54 each being suitably apertured to permit attachment of these arms by pivot bolts 55 to opposite sides of the lower clamping plate 34. With this arrangement, the alignment and support plate 53 is capable of swinging movement about an axis substantially parallel to and spaced below the axis of pivot of the clamping frame 24.

Means are also provided for power shifting the alignment and support plate 53 and this means includes a double acting pneumatic cylinder 56 connected by suitable conduit means (not shown) to a suitable source of air under pressure and having a piston movable therein. This pneumatic cylinder 56 is pivotally connected by means of a pivot 56d to a bracket 56e carried by the lower jaw member 34 at a point spaced below the pivotal axis of the plate 53. This arrangement permits pivoting swinging movement of the pneumatic cylinder 56 about a substantially transverse axis parallel to the axis of pivot of the plate 53.

The piston within the pneumatic cylinder 56 is provided with a piston rod 56c which has its outermost end pivotally connected by means of a pivot 56b to a bracket 56a which is secured to the plate 53 intermediate the ends thereof. It will be seen that extension of the piston rod 56c will swing the plate 53 from its lowermost position, as illustrated in dotted line configuration on FIG. 1, to an elevated position, which movement will tend to align the humerus bone of a pork shoulder with the radius and ulna bones thereof.

A bone immobilizing mechanism is also provided which serves to interlock the bones of the articulated joint in pre-determined relation. This bone immobilizing mechanism designated generally by the reference numeral 57, as best seen in FIG. 5, comprises a fitting 58 preferably formed of a ferrous metal and having an annular groove 59 therein. A stem or male socket element 60 is rigidly affixed to the fitting 59 and projects axially therefrom, the terminal end 61 of the stem 60 being of hexagonal cross-sectional configuration.

An elongate immobilizing pin 62 is fixedly mounted in the fitting 58 to project axially therefrom, and this pin 62 is adapted to be driven through the bones at the joint and immobilize the same against movement from a pre-determined position. A second pin 63 also has one end affixed to the fitting 58 and projects axially therefrom and is disposed in substantially parallel relation with respect to immobilizing pin 62. These pins are disposed at close proximity to each other, and the pin 63 is of shorter length than pin 62 and is adapted to be driven into only one of the bones of the joint. The purpose of the additional pin 63 is to prevent rotation of the pin 62 about its longitudinal axis relative to the bones of the joint during the deboning operation. It is pointed out that when the bone immobilizing mechanism 57 is actually applied to the bones of a joint in a chunk of meat to be deboned, this immobilizing mechanism 57 also serves as a connecting means with respect to certain components of the deboning apparatus.

Means are also provided for impelling the bone immobilizing mechanism 57 towards the chunk of meat so that the pins 62 and 63 will be driven into the bones of the articulated joint. This impeller means, designated generally by the reference numeral 64, includes an elongate generally rectangular mounting member 65 of substantially channel shaped cross-sectional configuration. The mounting member 65 has a pair of mounting brackets 66 affixed thereto in spaced apart relation and depending therefrom. These mounting brackets 66 are each comprised of a substantially flat rectangular attachment plate 67, each having a pair of spaced apart substantially parallel vertical plates rigidly affixed thereto and depending therefrom. Although only one of the vertical plates 68 for each mounting bracket 66 is shown in the drawing, it is pointed out that these vertical plates 68 are disposed in close proximal relation to define a space therebetween. Each is suitably apertured to permit a nut and bolt assembly 69 to extend therethrough. In the embodiments shown, a pair of apertures are provided in the vertical plates of each attachment bracket as best seen in FIG. 1.

The support members 13 are provided with a pair of mounting brackets, each including a substantially flat attachment plate 70 which is suitably apertured to permit attachment by means of bolt and nut assemblies 71 to the support members. Each attachment plate 70 also has a vertical plate 72 rigidly affixed thereto and extending upwardly therefrom and positioned between the pair of vertical plates of the associated mounting bracket 66. These vertical plates 72 are provided with vertical slots 73 therein, through which the nut and bolt assemblies 69 pass, whereby the impeller means may be adjusted vertically relative to the support 12.

An elongate impeller cylinder 74 is positioned on the mounting member 65 and this cylinder has one end thereof disposed in close proximity to the positioning and clamping structure 14 as best seen in FIG. 1. The impeller cylinder 74 has a generally rectangular shaped mounting block 75 affixed to one end thereof and this mounting block which is vertically disposed has an outturned attachment flange 76 affixed at the lower end thereof and suitably apertured to permit attachment thereof by suitable bolt means to the mounting member 65.

The opposite end of the impeller cylinder 74 has an L-shaped mounting bracket 77 affixed thereto, and this L-shaped bracket is also suitably apertured to permit the passage of bolt and nut assemblies therethrough for attachment to the mounting member 65. A vertically disposed thrust block 78 having a bore therethrough is welded to the mounting member 65 in close proximity to the angle bracket 77 and this thrust block is provided with a generally rectangular shaped rubber bumper element 79 which is also provided with a bore therethrough. The rubber bumper element 79 is positioned against the forward end of the impeller cylinder 74, as best seen in FIGS. 1 and 2, and it will be noted that the mounting block 75 and thrust block 78 are each provided with angularly disposed forwardly projecting gussett plates to reinforce the same against a forward component of force.

An elongate impeller rod or member 80 projects through the impeller cylinder 74 and this impeller rod is axially movable relative to the cylinder. The forward end of the impeller rod 80 has a female socket member 81 affixed thereto for movement therewith and this socket member 81 has a recess 82 therein for frictionally but releasably engaging and retaining the stem 60 of the bone immobilizing mechanism 57 therein. The impeller rod 80 also has an annular collar 83 affixed thereto intermediate the ends thereof but preferably spaced closer to the forward end than to the rear end of the impeller rod. The rear end of the impeller rod 80 has a sleeve 84 mounted with press fit thereon and this sleeve as well as the impeller rod have registering apertures therein through which a pin 85 projects. It will be noted, that the pin 85 projects radially outwardly from opposite sides of the sleeve and the function of this pin will be more fully explained hereinbelow.

The impeller rod 80 is impelled towards the chunk of meat having the bones therein to be immobilized by a relatively strong helical spring 86 which is positioned within the impeller cylinder 74 and has its forward end engaging the collar 83 and has its rear end disposed against an annular shoulder 75a defined by the mounting block 75. To this end, it will be noted that the bore through the mounting block 75 is slightly less than the internal diameter of the cylinder 74 to thereby define the annular shoulder 75a. It will therefore be seen that when the impeller rod 80 is retracted rearwardly, as shown in FIG. 1, the helical spring 86 will be compressed, whereby when the rod 80 is released, it will be impelled forwardly with great velocity to drive the pins 62 and 63 into the bones in the chunk of meat supported on the positioning and clamping structure 14.

Figure 3:
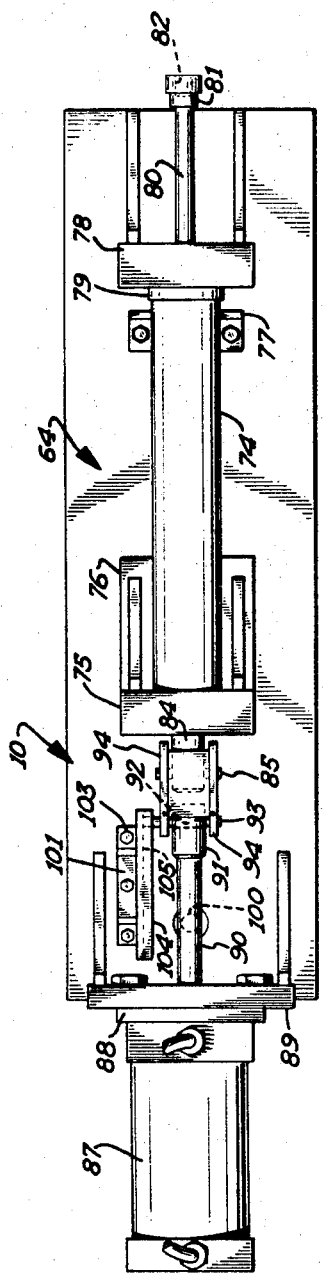
FIG. 3 is a top plan view of the impeller means.

In FIG. 3 the rod 80 is in the forward position.

Means are provided for retracting the impeller rod 80 against the bias of the impeller spring 86 and this means includes a double acting pneumatic cylinder 87 having a piston movable therein and being connected to a suitable source of air under pressure by suitable conduit means (not shown). The forward end of the cylinder 87 is provided with an outwardly projecting flange 88 which has apertures therein. Flange 88 is mounted by suitable bolt means to a mounting block 89 which is secured to the mounting member 65 as by welding or the like. The mounting block 89 is also provided with suitable forwardly projecting gussett plates that reinforce the same against a forward shock impulse.

The piston in the penumatic cylinder 87 is connected to a piston rod 90 and this piston rod projects outwardly of the cylinder and has a sleeve 91 secured to the forward end thereof. Sleeve 91 has a diametrical opening 92 therein in which a pivot pin 93 is journalled. A pair of generally U-shaped pin engaging latch members 94 are affixed at opposite ends of the pin 93 for revolving movement with the pin and it will be noted that these latch members are each shaped to define a latch surface 95 and an adjacent camming surface 96. With this arrangement, when the piston rod 90 is extended, the camming surface on the latch members 94 will engage the pin 85 to permit camming of the latch members upwardly about the pivot axis defined by the pin 93. Thereafter, the latch members 94 will drop over the pin 85 so that the pin is engaged by the latch surfaces 95 and will be releasably retained thereby. When the piston rod 90 is retracted, the impeller rod will also be retracted.

The latch members 94 are interconnected adjacent their lower most ends by transverse element 97 which element is involved in the release of the latching members from latching engagement with the pin 85. To this end, it will be seen that a pneumatic cylinder 98 is mounted on the support member 65 and is vertically oriented relative thereto. The pneumatic cylinder 98 is a double acting type and has a piston movable therein which is connected to a piston rod 99. It will be noted that the piston rod 99 projects through an aperture in the mounting member 65. An enlarged actuating or striker element 100 is affixed to the end of piston rod 99 and is movable therewith.

Figure 4:
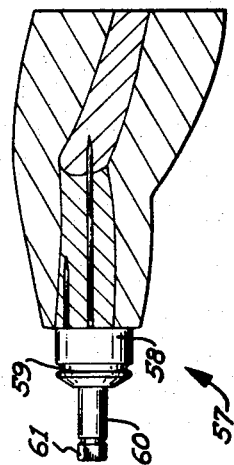
FIG. 4 is a sectional view of a chunk of meat having an articulated bone joint which has been immobilized in accordance with the present invention.

It is pointed out that when the piston rod 90 is retracted to retract the impeller rod 80, the latching members 94 will also be retracted so that the transverse element 97 will be positioned above and in obstructing relation with respect to the striker element 100. Thereafter, when the piston rod 99 is extended, the striker element 100 will engage the transverse element 97 and cause the latching members to swing about the pivotal axis defined by the pin 93 in a counterclockwise direction as viewed in FIG. 4, thus releasing the pin 85 and allowing the impeller rod to be impelled forwardly by action of the helical spring 86.

Means are also provided for guiding and positioning the latching members 94 during retractable and extensible movement thereof. Again, referring to FIGS 1 and 2, it will be seen that an L-shaped mounting bracket 101 is provided which includes a vertical plate 102 having a horizontal flange 103 affixed to the lower end thereof, and projecting outwardly therefrom. The flange 103 has a plurality of apertures therein through which suitable bolt means project and which pass through registering apertures in the mounting member 65 to rigidly mount the bracket 101 on the mounting member 65. An elongate channel shaped guide member 104 having a channel shaped guide recess 105 therein is rigidly affixed to the upper end of the bracket plate 102, and it will be seen that the guide recess 105 receives one end of the pin 93 therein. The guide recess 105 is horizontally oriented and is of the length to accommodate the end of the pin 93 therein during longitudinal travel of the latter in either direction. With this arrangement, the pin and the latch members secured thereto are guided in a manner to assure effective latching and release of the latch members with respect to the pin 85.

During operation of the immobilizing apparatus 10, the positioning and clamping structure 14 will be adjusted to properly orient the bones of the articulated joint in the cut or chunk of meat to be deboned. To this end, it is pointed out that the chunk of meat to be deboned may be a primal cut such as a picnic ham or pork shoulder. Even though only one cut or type of chunk of meat is to be deboned (such as picnics) certain adjustments of the positioning and clamping structure 14 will be necessary since such chunks of meat will vary in size. Therefore, slight adjustments would be made for a run of the smaller size pork shoulders as compared to a run of the larger size pork shoulders. This adjustment may be accomplished by pivoting the positioning frame 15 as well as the clamping frame 24 about their respective axis of pivot.

Thereafter, the chunks of meat to be deboned will be fed into the positioning and clamping structure so that the smaller end of the chunk of meat will be received between the clamping jaws 36 and 37. If the chunk of meat to be deboned is a picnic ham, then the smaller end which contains the radius and ulna will be clamped between the clamping jaws 36 and 37. The alignment and support member 53 will be swung upwardly by actuation of the associated piston and cylinder unit so that the radius and ulna will be more aligned with the humerus bone within the chunk of meat. The impeller rod 80 will have been retracted to its retracted position and the bone immobilizing mechanism 57 will be detachably connected with the female socket member 81 on the rod 80. Thereafter, when the piston rod 99 is extended, the actuator or striker element 100 will strike the transverse element 97 thereby swinging the latch member 94 out of engaging relation with respect to the pin 85 and releasing the impeller rod so that the latter will be impelled forwardly. The immobilizing pins 62 and 63 will be driven into the bones at the articulated joint, the longer pin 62 being driven through the ulna and humerus while the shorter pin is driven into the radius bone.

It is pointed out that the radius or haitch will have its distal or exposed end thereof severed when the picnic or shoulder is prepared. Since the haitch or radius bone is a typical shaft bone, the bone will be hollow and the operator may insert a probe into the interior of this bone while the shoulder is supported in the supporting structure to facilitate alignment of the bones of the articulated joint. In an automated system, this probe type of alignment prior to immobilizing the joint may be performed automatically by a suitable mechanical or perhaps electromechanical means.

The piston rod 90 will then be extended and the camming surface 96 of the latch member 94 will engage the pin 85 and will cause the latch members to be swung upwardly to ride over the pin whereby the latch surfaces 95 will engage the latter. When the piston rod 90 is thereafter retracted, the stem or male socket element 60 will be disengaged from the female socket element 81 and the chunk of meat having its joint immobilized may then be released from the clamping and support structure and will thereafter be conveyed to the deboning apparatus. As pointed out above, the bone immobilizing mechanism and especially the fitting in male socket element or stem 60 also constitutes part of the coupling mechanism for coupling the picnic or other chunk of meat to the deboning apparatus during the deboning operation.

It is pointed out that the operation and control of the various components of the immobilizing apparatus may be automated and coordinated with operation of the deboning apparatus.

From the foregoing description it will be seen that we have provided a novel immobilizing apparatus which is capable of very effectively immobilizing the articulated joints in a chunk of meat to thereby effectively prepare the chunk of meat for a subsequent deboning operation.

It will also be noted from the preceding paragraphs that not only is the bone joint immobilizing apparatus of simple and inexpensive construction, but the apparatus is especially adapted for a continuous deboning operation.

It will, of course, be understood that various changes may be made in the form, details, arrangement and proportions of the various parts without departing from the scope of our invention.

What we claim is:

1. Apparatus for immobilizing an articulated joint between a pair of bones in a chunk of meat, said apparatus comprising a support, releasable clamping means mounted on said support for releasably clamping a chunk of meat therein, alignment means shiftably interconnected with the clamping means for relative shifting movement therebetween to cause shifting of the bones of the articulated joint in the chunk of meat into more aligned relation, joint immobilizing mechanism having pin means projecting outwardly therefrom, an impeller means positioned in proximal relation with said clamping means and having means thereon for releasable engagement and support of said joint immobilizing mechanism, said impeller means being operable to impel the joint immobilizing mechanism towards said clamping means whereby said pin means will pierce and be driven into the bones of the chunk of meat at the articulated joint thereof to interlock the bones in their aligned relation.

2. The apparatus as defined in claim 1 wherein said clamping means includes a clamping frame, means shiftably mounting said clamping frame on said support, a pair of clamping jaws shiftably mounted on said frame and being shiftable between clamping and release positions, and means interconnected with said clamping jaws for shifting the same between said clamping and release positions.

3. The apparatus as defined in claim 2 wherein said mounting means comprises a positioning frame mounted on said support for pivoting movement relative to said support, said clamping frame being pivotally mounted on said positioning frame for pivotal movement about an axis disposed substantially normal to the axis of pivot of said mounting frame.

4. The apparatus as defined in claim 2 wherein said means for shifting said jaws comprises a fluid pressure, piston and cylinder unit, and linkage means interconnecting said fluid pressure piston and cylinder unit with said jaws.

5. The apparatus as defined in claim 2 wherein said alignment means comprises an alignment plate pivotally mounted on one of said clamping jaws.

6. The apparatus as defined in claim 1 wherein said impeller means comprises a plunger having means on one end thereof for releasable connection to said joint immobilizing mechanism, means slidably mounting said plunger for longitudinal movement between a retracted cocked position and an extended released position, yieldable means for impelling said plunger from said retracted cocked position to said extended release position, and power means for retracting said plunger from said release position to said cocked position.

7. The apparatus as defined in claim 6 wherein said yieldable means comprises a helical spring.

8. The apparatus as defined in claim 6 and cooperating releasable interlocking elements on said plunger and said power retracting means whereby said power retracting means is releasably interlocked with said plunger during retraction of the latter to said cocked position, and release mechanism being operable to engage one of said interlocking elements to release said elements from said interlocked condition.

References Cited

UNITED STATES PATENTS

| 2,851,362 | 9/1958 | Goldberg | 17—1 X |
| 3,118,444 | 1/1964 | Serrato | 128—92 |
| 3,248,752 | 5/1966 | Segur et al. | 17—1 X |

FOREIGN PATENTS

| 679,888 | 8/1939 | Germany. |

LUCIE H. LAUDENSLAGER, *Primary Examiner.*